United States Patent
Han et al.

(10) Patent No.: US 9,419,326 B2
(45) Date of Patent: Aug. 16, 2016

(54) ANTENNA PATTERN FRAME, METHOD AND MOLD FOR MANUFACTURING THE SAME, METHOD FOR MANUFACTURING AN ELECTRONIC DEVICE CASE, AND ELECTRONIC DEVICE

(75) Inventors: Chang Mok Han, Chungcheongnam-do (KR); Jae Suk Sung, Gyunggi-do (KR); Sung Eun Cho, Gyunggi-do (KR); Ha Ryong Hong, Gyunggi-do (KR); Nam Il Seo, Seoul (KR); Dae Ki Lim, Gyunggi-do (KR); Ki Won Chang, Gyunggi-do (KR); Kyong Keun Lee, Gyunggi-do (KR); Chan Gwang An, Gyunggi-do (KR); Tae Sung Kim, Seoul (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 1272 days.

(21) Appl. No.: 12/879,534

(22) Filed: Sep. 10, 2010

(65) Prior Publication Data
US 2011/0068984 A1    Mar. 24, 2011

(30) Foreign Application Priority Data
Sep. 22, 2009  (KR) .................. 10-2009-0089745

(51) Int. Cl.
*H01Q 1/24* (2006.01)
*B29C 45/14* (2006.01)
*B29C 45/16* (2006.01)
(Continued)

(52) U.S. Cl.
CPC .......... *H01Q 1/243* (2013.01); *B29C 45/14065* (2013.01); *B29C 45/1671* (2013.01); *H01Q 1/38* (2013.01); *B29C 2045/14122* (2013.01); *B29L 2031/3431* (2013.01);
(Continued)

(58) Field of Classification Search
CPC ............ H01Q 1/38; H01Q 1/40; H01Q 1/243
USPC .................................................. 343/702, 873
See application file for complete search history.

(56) References Cited

U.S. PATENT DOCUMENTS

| | | | |
|---|---|---|---|
| 6,366,261 | B1 | 4/2002 | Stout et al. |
| 6,396,444 | B1 | 5/2002 | Goward et al. |

(Continued)

FOREIGN PATENT DOCUMENTS

| | | |
|---|---|---|
| CN | 1917282 A | 2/2007 |
| CN | 1976116 A | 6/2007 |

(Continued)

OTHER PUBLICATIONS

Office Action corresponding to JP 2010-204552, dated Aug. 15, 2012.

(Continued)

*Primary Examiner* — Dieu H Duong
(74) *Attorney, Agent, or Firm* — NSIP Law

(57) ABSTRACT

An antenna pattern frame includes: a radiator having an antenna pattern part for receiving an external signal; a radiator frame having the radiator injection-molded to have the antenna pattern part formed thereon and including the antenna pattern part buried at an inner side of an electronic device; and an over-mold part injection-molded together with the radiator frame and over-molded to be formed on the antenna pattern part in order to prevent the antenna pattern part from becoming separated from the radiator frame.

19 Claims, 11 Drawing Sheets

(51) Int. Cl.
*H01Q 1/38* (2006.01)
*B29L 31/34* (2006.01)

(52) U.S. Cl.
CPC . *B29L 2031/3437* (2013.01); *B29L 2031/3456* (2013.01); *Y10T 29/49016* (2015.01)

(56) References Cited

U.S. PATENT DOCUMENTS

| | | | |
|---|---|---|---|
| 7,317,422 B2 | 1/2008 | Yun et al. | |
| 7,495,618 B2 | 2/2009 | Kurashima et al. | |
| 2001/0054780 A1 | 12/2001 | Ogura | |
| 2002/0093457 A1 | 7/2002 | Hamada et al. | |
| 2003/0030586 A1 | 2/2003 | Suzuki et al. | |
| 2003/0179144 A1* | 9/2003 | Takesako et al. | 343/702 |
| 2007/0040755 A1 | 2/2007 | Na et al. | |
| 2009/0002242 A1* | 1/2009 | Lasarov | H01Q 1/243 343/702 |
| 2009/0015490 A1* | 1/2009 | Honda | H01Q 1/243 343/702 |
| 2009/0015510 A1 | 1/2009 | Nakata et al. | |
| 2009/0051616 A1 | 2/2009 | Hong et al. | |
| 2009/0058733 A1 | 3/2009 | Kurashima et al. | |
| 2009/0322629 A1* | 12/2009 | Hung et al. | 343/702 |
| 2010/0271265 A1 | 10/2010 | Sung et al. | |

FOREIGN PATENT DOCUMENTS

| | | | |
|---|---|---|---|
| CN | 201163628 Y | 12/2008 | |
| EP | 1217688 A1 | 6/2002 | |
| EP | 1944830 A1 | 7/2008 | |
| JP | 5762635 A | 4/1982 | |
| JP | 6253910 A | 9/1994 | |
| JP | 9102709 A | 4/1997 | |
| JP | 2000-183626 A | 6/2000 | |
| JP | 2002280821 A | 9/2002 | |
| JP | 2003036431 A | 2/2003 | |
| JP | 200378323 A | 3/2003 | |
| JP | 2004-534436 A | 11/2004 | |
| JP | 2008011126 A | 1/2008 | |
| JP | 2008072559 A | 3/2008 | |
| JP | 2009-49992 A | 3/2009 | |
| KR | 1020060088073 A | 8/2006 | |
| KR | 20070109332 A | 11/2007 | |
| KR | 100915353 B1 | 8/2009 | |
| KR | 100932079 B1 | 12/2009 | |
| WO | 02/082582 A1 | 10/2002 | |
| WO | 2007/083921 A1 | 7/2007 | |

OTHER PUBLICATIONS

Office Action corresponding to 201010293947.8, dated Apr. 24, 2013.
European Examination Report dated Aug. 8, 2013.
KIPO Office Action for KR 10-2009-0089745, issued Apr. 11, 2011.
European Search Report for EP 10251605, dated May 17, 2011.
Japanese Office Action corresponding to JP 2010-204552 dated Jan. 17, 2012.
Notice of Office Action issued in Japanese Patent Application No. 2012-250081 dated Oct. 15, 2013.
Extended European Search Report for Application No. 11002680.4 mailed Jun. 8, 2011.
Chinese Office Action issued on Jun. 30, 2015, in counterpart Chinese Application No. 201410058022.3 (7 pages in English, 6 pages in Chinese).
Summons to Attend Oral Proceedings dated Dec. 12, 2014 issued in corresponding European Patent Application No. 10251605.1.

* cited by examiner

ANTENNA PATTERN FRAME, METHOD AND MOLD FOR MANUFACTURING THE SAME, METHOD FOR MANUFACTURING AN ELECTRONIC DEVICE CASE, AND ELECTRONIC DEVICE

CROSS-REFERENCE TO RELATED APPLICATIONS

This application claims the priority of Korean Patent Application No. 10-2009-0089745 filed on Sep. 22, 2009, in the Korean Intellectual Property Office, the disclosure of which is incorporated herein by reference.

BACKGROUND OF THE INVENTION

1. Field of the Invention

The present invention relates to an antenna pattern frame capable of preventing an antenna pattern part from becoming separated from an antenna pattern frame, a method and mold for manufacturing the same, a method for manufacturing an electronic device case, and an electronic device.

2. Description of the Related Art

Electronic devices such as mobile communication terminals including mobile phones, PDAs, navigation devices, notebook computers, and the like, supporting radio communication, are considered requisite devices in modern society. Mobile communication terminals are evolving into devices featuring functions such as CDMA (code division multiple access), WLAN (wireless local area network), GSM (global system for mobile communications), DMB (digital media broadcast), and the like. Due to the wireless nature of mobile communication terminals, one of the key components making those functions feasible is antennas.

Antennas used for mobile communication terminals have tended to shift from external type antennas such as a rod antenna or a helical antenna towards internal type antennas disposed within terminals.

External type antennas are vulnerable to external impacts, while internal type antennas have a problem in that they necessarily increase the size of the terminals they are disposed within.

Thus, in an effort to solve such problems, research is actively ongoing aimed at integrating mobile communication terminals and the antennas thereof.

In order to implement the integration of an antenna with an mobile communication terminal, a flexible antenna is attached to the terminal body by an adhesive or, recently, an antenna film is molded therearound.

However, a simple attachment of the flexible antenna to the terminal body with an adhesive causes a problem in that when the adhesive is weak, the reliability of the antenna deteriorates. Also, the external appearance of the mobile communication terminal suffers, reducing the desirability of the mobile communication terminal to potential customers.

Also, while the use of an antenna film may secure the stability of a product, it is not easy to attach the antenna to a film and the fabrication cost thereof may be excessive.

SUMMARY OF THE INVENTION

An aspect of the present invention provides an antenna pattern frame capable of preventing an antenna pattern part from becoming separated from a radiator frame and having the antenna pattern part buried within an electronic device case.

Another aspect of the present invention provides a method for manufacturing an antenna pattern frame having an antenna pattern part formed on a surface of the antenna pattern frame in order to bury the antenna.

According to an aspect of the present invention, there is provided an antenna pattern frame including: a radiator having an antenna pattern part for receiving an external signal; a radiator frame having the radiator injection-molded to have the antenna pattern part formed thereon and including the antenna pattern part buried on an inner side of an electronic device; and an over-mold part injection-molded together with the radiator frame and over-molded so as to be formed on the antenna pattern part in order to prevent the antenna pattern part from becoming separated from the radiator frame.

The radiator may include: a connection terminal portion transmitting a received external signal to the electronic device; and a connection portion connecting the antenna pattern part and the connection terminal portion such that they form different planes, and having the connection terminal portion formed on the opposite side of one surface of the radiator frame.

The connection portion of the antenna pattern frame may be bent at an angle to the connection terminal portion and the antenna pattern part.

The connection terminal portion of the antenna pattern frame may be supportedly mounted so as to be in contact with a radiator support which is injection-molded so as to be protruded from the opposite surface of the radiator frame.

The connection portion of the antenna pattern frame may be formed so as to penetrate the radiator support.

The radiator of the antenna pattern frame may include a guide pin hole in which a guide pin of a manufacturing mold is positioned so as to prevent the radiator from moving within the manufacturing mold during injection molding.

The radiator of the antenna pattern frame may include a connection pin hole in which a connection pin of the manufacturing mold is positioned so as to prevent the radiator from moving within the manufacturing mold during injection molding.

The antenna pattern part of the antenna pattern frame may have antenna patterns formed in zigzags, and the over-mold part may be formed so as to cover a portion of adjacent antenna patterns of the antenna pattern part.

The antenna pattern part of the antenna pattern frame may have antenna patterns formed in zigzags, and the over-mold part is formed so as to cover the entirety of adjacent antenna patterns of the antenna pattern part.

The antenna pattern part of the antenna pattern frame may have antenna patterns formed in zigzags, and a contact pin mark is formed so as to be protruded at the antenna pattern part where the over-mold part is formed.

The radiator of the antenna pattern frame may be flexible so as to be disposed within a curved portion of the radiator frame.

The radiator of the antenna pattern frame may be formed so as to have the same boundary surface as the radiator frame.

According to another aspect of the present invention, there is provided a method for manufacturing an antenna pattern frame, including: providing a radiator having an antenna pattern part receiving an external signal to an internal space of an antenna pattern frame, such that the radiator is in contact with one surface of a manufacturing mold of the antenna pattern frame; filling the manufacturing mold of the antenna pattern frame with a resin material such that the internal space of the manufacturing mold of the antenna pattern frame becomes a radiator frame with the antenna pattern part formed thereon; and when the manufacturing mold of the radiator frame is filled with the resin material, filling the resin material up to an over-mold part formation portion formed so as to be recessed into one surface of the manufacturing mold of the antenna pattern frame with which the antenna pattern part is in contact, in order to form an over-mold part preventing the antenna pattern part from becoming separated from the radiator frame.

The radiator may include a connection terminal portion transmitting the external signal to an electronic device and a connection portion connecting the antenna pattern part and the connection terminal portion such that they are disposed on different planes, and may be provided in the manufacturing mold of the antenna pattern frame, and the connection portion may be in contact with the opposite side of the antenna pattern frame and injection-molded.

The antenna pattern part may be provided to the manufacturing mold in zigzags, and a contact pin may be provided in the manufacturing mold in order to press the antenna pattern part with sufficient pressure to make contact pin marks formed on the antenna pattern part be protruded.

The contact pin marks may be formed in a row on the antenna pattern part such that they have the same line as that of the over-mold part.

According to another aspect of the present invention, there is provided a manufacturing mold of an antenna pattern frame, including: an upper or lower mold with which an antenna pattern part receiving an external signal is in contact and is thereby supported; a resin material injection part formed on the upper or lower mold or on the upper and lower molds and allowing a resin material to be introduced into an internal space formed as the upper and lower molds are coupled, so that the internal space can become a radiator frame; and an over-mold part formation portion formed so as to be recessed into the upper or lower mold in order to form an over-mold part preventing the radiator from becoming separated from an antenna pattern frame at such time as the internal space becomes the radiator frame.

The radiator may include a connection terminal portion transmitting the external signal to an electronic device and a connection portion connecting the antenna pattern part and the connection terminal portion such that they are disposed on different planes, and the connection terminal portion may be supportedly mounted so as to be in contact with another one of the upper and lower molds where the antenna pattern part is supportedly in contact.

The over-mold part formation portion may be formed such that the over-mold part covers a portion of the antenna pattern part.

The over-mold part formation portion may be formed such that the over-mold part covers the entirety of adjacent antenna patterns of the antenna pattern part formed in zigzags.

According to another aspect of the present invention, there is provided a method for manufacturing an electronic device case, including: disposing an antenna pattern frame, which includes an over-mold part injection-molded on an antenna pattern part that receives an external signal in order to prevent the antenna pattern part from becoming separated from a radiator frame, in an internal space of a manufacturing mold of an electronic device case; and filling the internal space of a manufacturing mold of an electronic device case with a resin material such that the internal space of the electronic device becomes a case frame of the electronic device in which the antenna pattern part is buried.

The resin material may have a temperature sufficiently high as to melt the surface of the over-mold part and the antenna pattern frame.

According to another aspect of the present invention, there is provided a method for manufacturing an electronic device case, including: providing an antenna pattern frame having an over-mold part injection-molded on an antenna pattern part that receives an external signal in order to prevent the antenna pattern part from becoming separated from a radiator frame; and inserting the antenna pattern frame into an electronic device case frame having a space allowing the antenna pattern frame to be inserted therein.

The antenna pattern frame and the electronic device case frame may be fixed by an adhesive.

According to another aspect of the present invention, there is provided an electronic device including: an antenna pattern frame having an over-mold part injection-molded on an antenna pattern part that receives an external signal in order to prevent the antenna pattern part from becoming separated from one surface of a radiator frame; an electronic device case frame allowing the antenna pattern part to be buried between the electronic device case frame and the antenna pattern frame; and a circuit board connected with the antenna pattern part and receiving the external signal.

The antenna pattern part of the electronic device may be buried between the electronic device case frame and the antenna pattern frame by injection-molding the antenna pattern frame in a manufacturing mold of an electronic device case having an internal space having a shape of the electronic device case frame.

The antenna pattern part of the electronic device may be connected with a connection terminal portion connected with the circuit board by a connection portion such that they form different planes, constituting an integral radiator, and the antenna pattern part and the connection terminal portion are supportedly mounted so as to be in contact with an upper or lower mold so as to be injection-molded when the upper and lower molds are coupled so as to manufacture the antenna pattern frame.

The connection portion of the electronic device may be formed so as to be bent at an angle to the antenna pattern part and the connection terminal portion.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
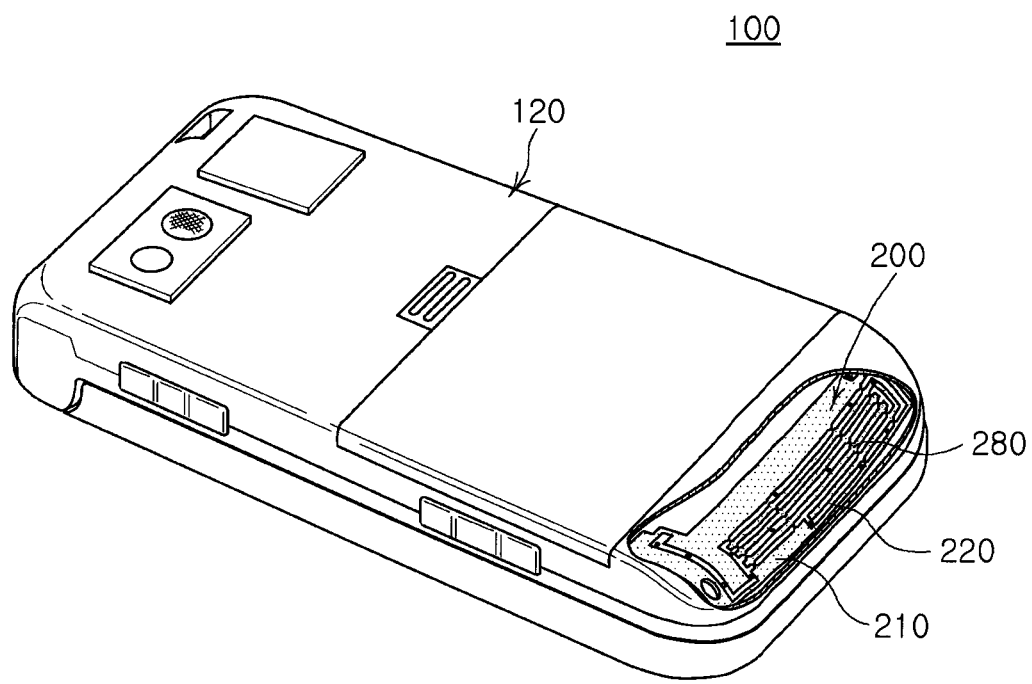
FIG. 1 is a schematic perspective view showing a case of a mobile communication terminal, an electronic device, with a partial cutaway.

Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions may be exaggerated for clarity, and the same reference numerals will be used throughout to designate the same or like components.

Figure 2:
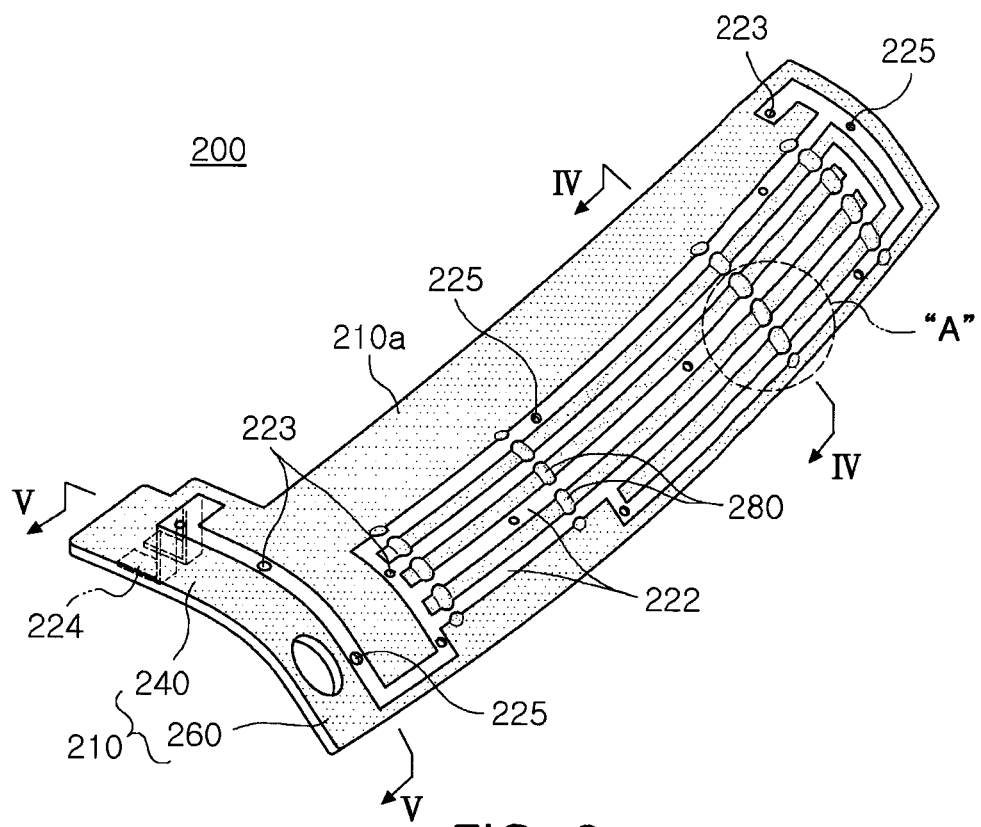
FIG. 2 is a schematic perspective view showing a first example of an antenna pattern frame according to an exemplary embodiment of the present invention.
Figure 3:
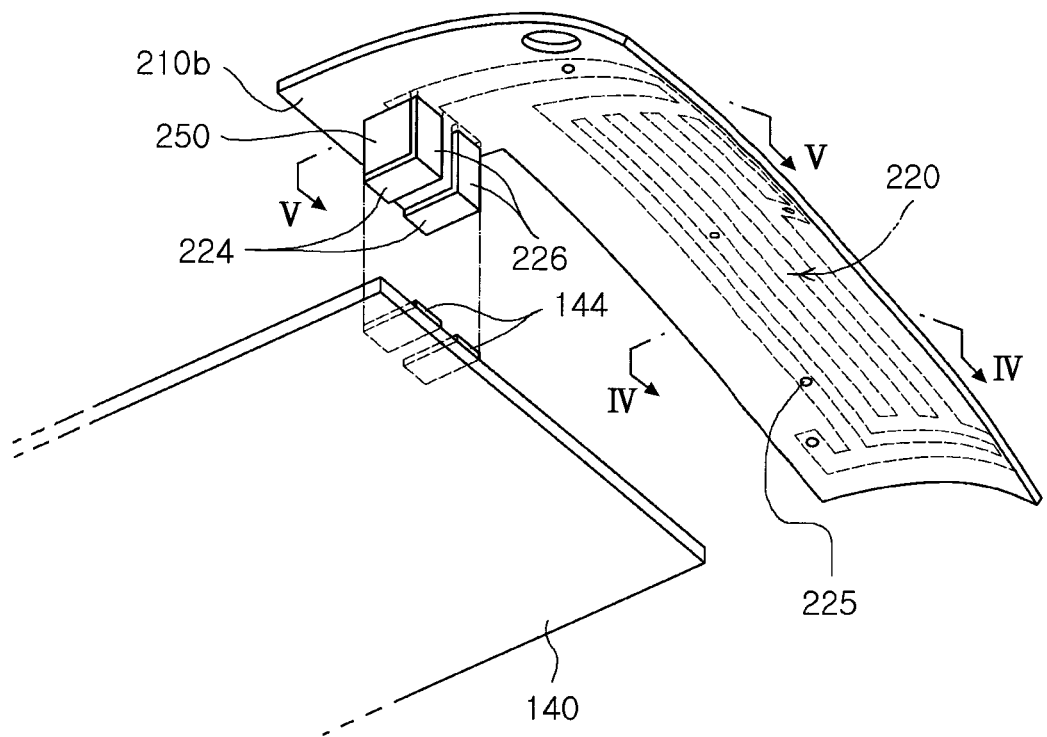
FIG. 3 is a schematic perspective view showing how a connection terminal portion of the antenna pattern frame of FIG. 2 is connected to a circuit board according to an exemplary embodiment of the present invention.
Figure 4:
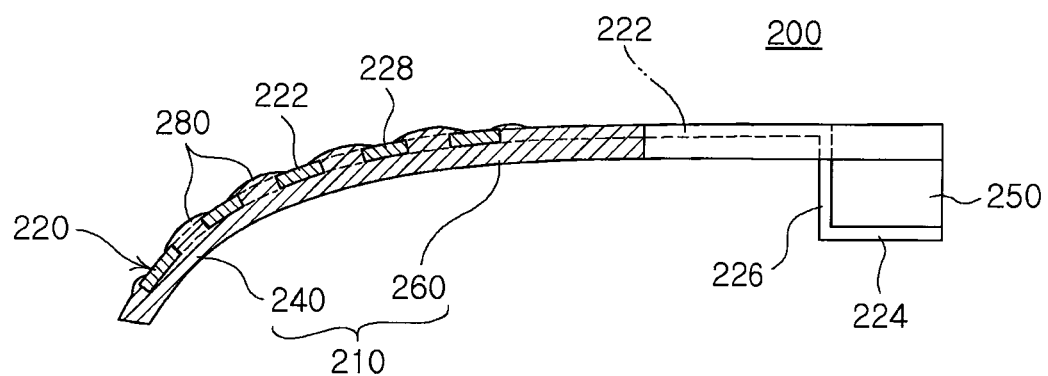
FIG. 4 is a sectional view taken along line IV-IV in FIGS. 2 and 3.
Figure 5:
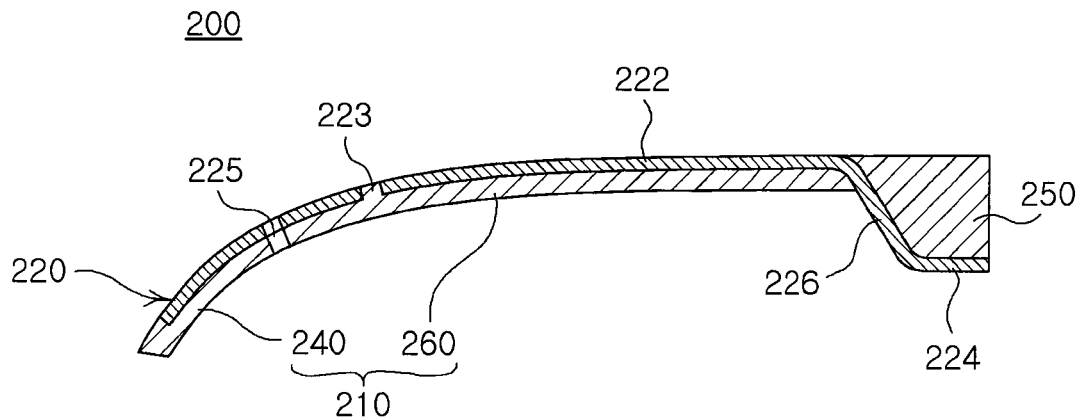
FIG. 5 is a sectional view taken along line V-V of the first example of the antenna pattern frame in FIGS. 2 and 3 according to an exemplary embodiment of the present invention.

FIG. 1 is a schematic perspective view showing a case of a mobile communication terminal, an electronic device, with a partial cutaway. FIG. 2 is a schematic perspective view showing a first example of an antenna pattern frame according to an exemplary embodiment of the present invention. FIG. 3 is a schematic perspective view showing how a connection terminal portion of the antenna pattern frame of FIG. 2 is connected to a circuit board according to an exemplary embodiment of the present invention. FIG. 4 is a sectional view taken along line IV-IV in FIGS. 2 and 3. FIG. 5 is a sectional view taken along line V-V of the first example of the antenna pattern frame in FIGS. 2 and 3 according to an exemplary embodiment of the present invention.

With reference to FIGS. 1 to 5, it is noted that a radiator 220 including an antenna pattern part 222 according to an exemplary embodiment of the present invention is buried in a case 120 of a mobile communication terminal 100. In order to form the radiator 220 having the antenna pattern part 222 within the case 120, an antenna pattern frame 200 is required to be configured such that the radiator 220 having the antenna pattern part 222 is formed on a radiator frame 210.

The antenna pattern frame 200 for forming an antenna pattern on the inner side of the case of the electronic device according to an exemplary embodiment of the present invention may include the radiator 220 having the antenna pattern part 222, the radiator frame 210, and an over-mold part 280.

The radiator 220, which is made of a conductive material such as aluminum, copper, or the like, may receive an external signal and transfer the received external signal to a signal processing device of the electronic device such as the mobile communication terminal 100. The radiator 220 includes the antenna pattern part 222 constituting a meander line in order to receive external signals having various bands.

The antenna pattern part 222 may have a zigzag form in which portions of antenna pattern part 222 are formed so as to be parallel to each other at certain intervals.

The radiator frame 210 may have a solid (i.e., cubic or three-dimensional) structure including a flat plane portion 260 and a curved portion 240 having curvature. The radiator 220 may have flexibility so as to be disposed on the curved portion 240 of the radiator frame 210.

The radiator 220 may be injection-molded such that the antenna pattern part 222 is formed on the surface of the radiator frame 210.

The radiator 220 may include a connection terminal portion 224 for transmitting a received external signal to the electronic device 100 and a connection portion 226 for connecting the antenna pattern part 222 and the connection terminal portion 224.

The connection portion 226 may connect the antenna pattern part 222 and the connection terminal portion 224 such that they form different planes.

The connection terminal portion 224, which transmits a received external signal to the electronic device, may be formed by bending, forming, or drawing out a portion of the radiator 220.

Here, the antenna pattern part 222 may be formed on one surface 210a of the radiator frame 210, and the connection terminal portion 224 may be formed on the opposite side of the one surface 210a, through injection-molding.

An adhesive may be applied to the one surface 210a of the radiator frame 210, and the one surface 210a with the antenna pattern part 222 formed thereon is attached at the inner side of the case 120 of the electronic device 100, thus manufacturing the electronic device case 120 with the antenna pattern part 222 buried therein.

Accordingly, the antenna pattern frame 200 serves as a primary injection-molded product by which the radiator 220 having the antenna pattern part 222 can be buried at the inner side of the electronic device case 120.

The radiator 220 may be configured so as to have the same boundary surface with the radiator frame 210. Such configuration may have the effect of increasing flow characteristics of an injection mold material such as a resin when the antenna pattern frame 200 is put into a mold and secondarily injection-molded.

The radiator 220 may include a guide pin hole 225 in which a guide pin (328 in FIG. 14) of a manufacturing mold 300 is positioned so as to prevent the radiator 220 from moving on the radiator frame 210 during molding.

In addition, the radiator 220 may further include a contact pin hole 223 in which a contact pin (326 in FIG. 12) of the manufacturing mold 300 is positioned so as to prevent the radiator 220 from moving on the radiator frame 210 during molding.

After the antenna pattern frame 200 is molded, the radiator frame 210 under the contact pin 326 is filled while the radiator frame 210 under the guide pin 328 has a hole.

The contact pin 326 inserted into the contact pin hole 223 formed on the radiator 220 serves to prevent the radiator 220 from moving in a horizontal direction within the manufacturing mold 300 during first injection molding. Also, the guide pin 328 inserted in the guide pin hole 225 formed on the radiator 220 serves to prevent the radiator 220 from moving in a vertical direction within the manufacturing mold 300 during the first injection molding.

The case in which the radiator 220 is disposed within the manufacturing mold 300 of the antenna pattern frame 200 by using only the guide pin 328 and the contact pin 326 and injection-molded may have a structural problem in that numerous holes must be formed on the antenna pattern part 222 and numerous pins must be installed in the manufacturing mold 300.

Thus, in order to solve such a problem, an over-mold part formation portion (380 in FIG. 12) may be formed to be recessed at the portion with which the antenna pattern part 222 is in contact in the manufacturing mold 300 in order to fix the antenna pattern part 222 in the manufacturing mold 300 without forming holes in the antenna pattern part 222.

The over-mold part 280 may be formed by filling the over-mold part formation portion 380 of the manufacturing mold 300 with a resin material when the radiator frame 210 is injection-molded.

The over-mold part 280 formed thusly serves to not only prevent the antenna pattern part 222 from becoming separated from the radiator frame 210 but firmly fix the antenna pattern part 222 to the radiator frame 210.

The guide pin 328 or the contact pin 326 of the manufacturing mold 300 may be replaced with the over-mold part formation portion 380 or be formed together with the over-mold part formation portion 380 so as to improve the reliability of the antenna pattern frame 200.

Various examples of the connection portion 226 connected with a circuit board of the electronic device of the antenna pattern frame 200 will now be described in detail.

First Example of Connection Portion 226 of the Antenna Pattern Frame

FIG. 5 is a sectional view taken along line V-V of the first example of the antenna pattern frame in FIGS. 2 and 3 according to an exemplary embodiment of the present invention.

With reference to FIG. 5, the radiator 220 of the antenna pattern frame 200 includes the connection portion 226 formed as a smooth curved portion connecting the connection terminal portion 224 and the antenna pattern part 222 such that they are disposed on different planes.

The antenna pattern part 222 and the connection terminal portion 224 may have a solid structure based on the connection portion 226, such that the radiator 220 is implemented with a three-dimensional curved surface.

A radiator support 250 may be protruded from the opposite surface 210b of the radiator frame 210 in order to support the radiator 220 with the three-dimensional curved surface. The radiator support 250 can be formed when the radiator frame 210 is injection-molded, so it can support both the connection portion 226 and the connection terminal portion 224.

Second Example of Connection Portion 226 of the Antenna Pattern Frame

Figure 6:
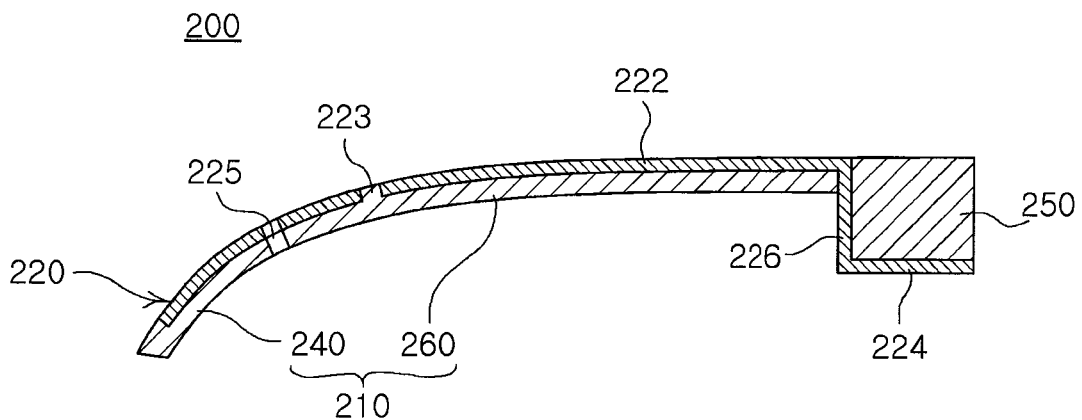
FIG. 6 is a sectional view taken along line V-V of a second example of the antenna pattern frame in FIGS. 2 and 3 according to an exemplary embodiment of the present invention.

FIG. 6 is a sectional view taken along line V-V of a second example of the antenna pattern frame in FIGS. 2 and 3 according to an exemplary embodiment of the present invention.

With reference to FIG. 6, the connection portion 226 may be formed to be bent at an angle to the connection terminal portion 224 and the antenna pattern part 222.

Like the first example of the connection portion 226 of the antenna pattern frame, the radiator support 250 protruded from the opposite surface 210b of the radiator frame 210 may be injection-molded so as to support both the connection portion 226 and the connection terminal portion 224.

Third Example of Connection Portion 226 of the Antenna Pattern Frame

Figure 7:
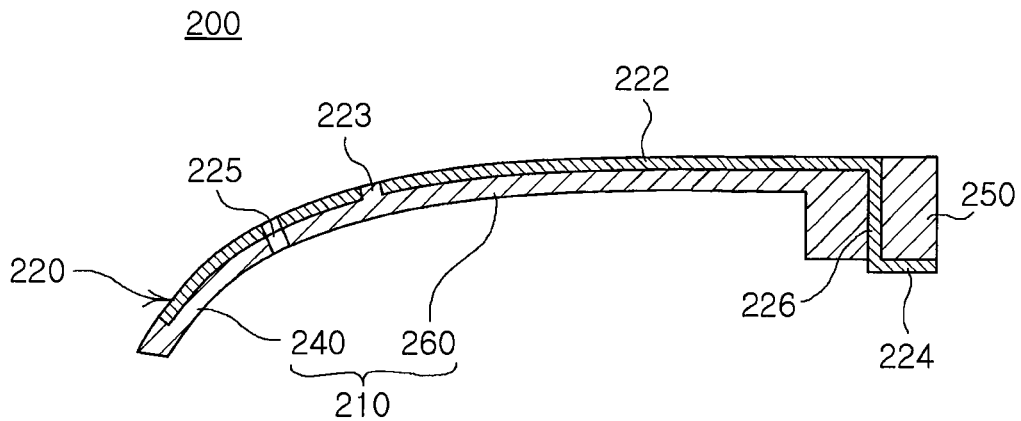
FIG. 7 is a sectional view taken along line V-V of a third example of the antenna pattern frame in FIGS. 2 and 3 according to an exemplary embodiment of the present invention.

FIG. 7 is a sectional view taken along line V-V of a third example of the antenna pattern frame in FIGS. 2 and 3 according to an exemplary embodiment of the present invention.

With reference to FIG. 7, the connection portion 226 may be formed to be bent at an angle to the connection terminal portion 224 and the antenna pattern part 222.

Unlike the second example of the connection portion, the third example of the connection portion 226 may be formed to penetrate the radiator support 250 protruded from the opposite surface 210b of the radiator frame 210. With such a configuration, the connection portion 226 is not exposed from the radiator support 250, reducing a phenomenon in which the connection portion 226 becomes separated from the radiator support 250.

Hereinafter, various examples of the over-mold part 280 formed as the antenna pattern frame 200 is injection-molded will be described.

Various Examples of Over-Mold Part 280 of the Antenna Pattern Frame

Figure 8:
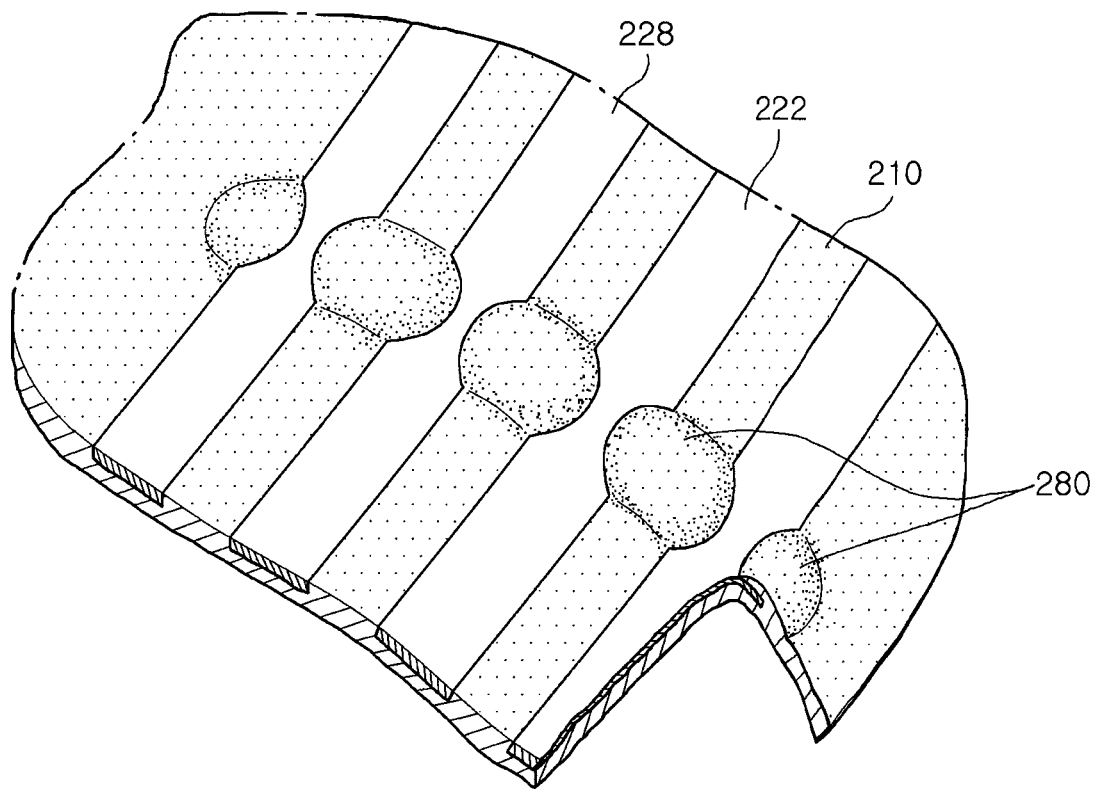
FIG. 8 is a schematic enlarged perspective view of a portion 'A' of the first example of the antenna pattern frame in FIG. 2 according to the first exemplary embodiment of the present invention.
Figure 9:
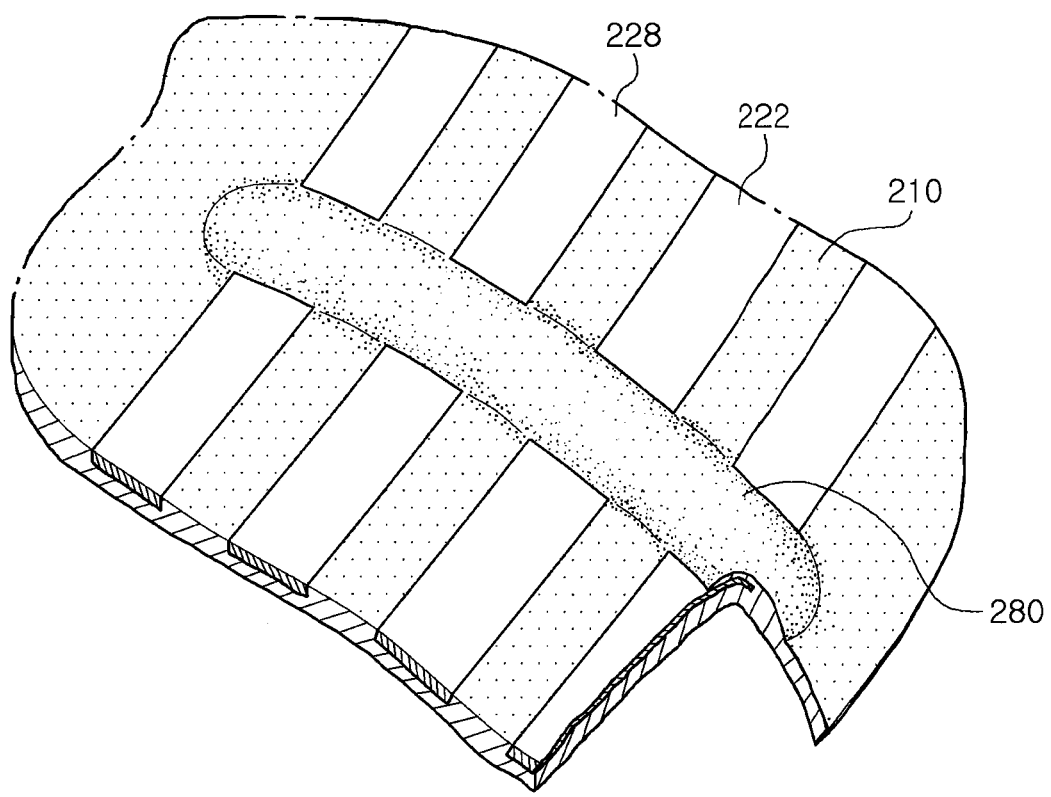
FIG. 9 is a schematic enlarged perspective view of a portion 'A' of the second example of the antenna pattern frame in FIG. 2 according to an exemplary embodiment of the present invention.
Figure 10:
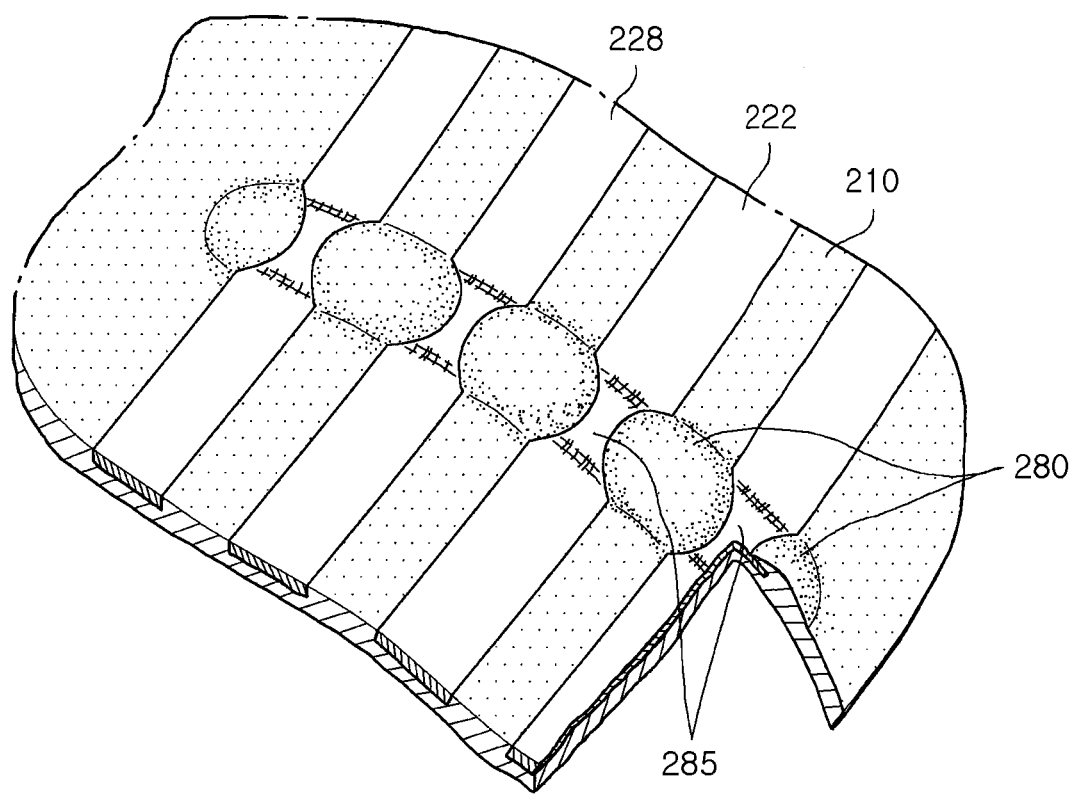
FIG. 10 is a schematic enlarged perspective view of a portion 'A' of the third example of the antenna pattern frame in FIG. 2 according to an exemplary embodiment of the present invention.
Figure 11:
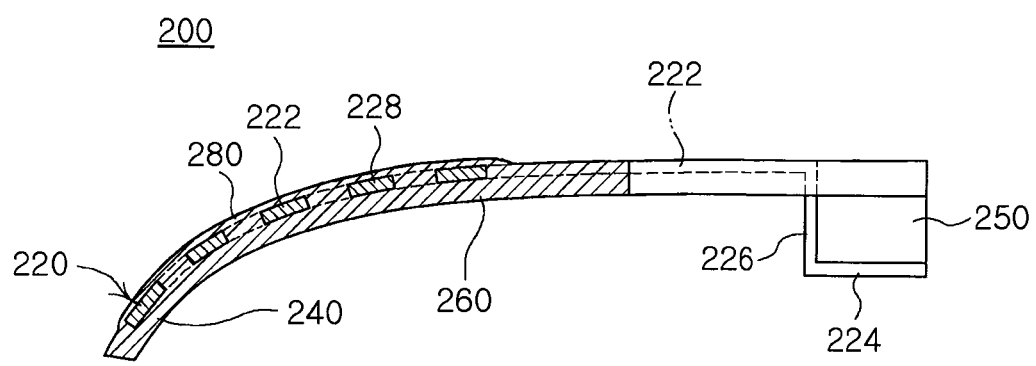
FIG. 11 is a sectional view showing the section of the antenna pattern frame in FIG. 9.

FIG. 8 is a schematic enlarged perspective view of a portion 'A' of the first example of the antenna pattern frame in FIG. 2 according to the first exemplary embodiment of the present invention. FIG. 9 is a schematic enlarged perspective view of a portion 'A' of the second example of the antenna pattern frame in FIG. 2 according to an exemplary embodiment of the present invention. FIG. 10 is a schematic enlarged perspective view of a portion 'A' of the third example of the antenna pattern frame in FIG. 2 according to an exemplary embodiment of the present invention. FIG. 11 is a sectional view showing the section of the antenna pattern frame in FIG. 9.

First, the antenna patter part may have a zigzag form in which antenna patterns 222 and 228 are disposed so as to be parallel to each other at certain intervals.

According to a first example of the antenna pattern frame of FIG. 8, the over-mold part 280 may be formed so as to cover a portion of adjacent antenna patterns 222 and 228 of the antenna pattern part, respectively. The over-mold part 280 is formed so as to cover a portion of the adjacent patterns 222 and 228 of the antenna pattern part at such time as a resin material is filled in the over-mold part formation portion 380 formed in the manufacturing mold 300 (300 in FIG. 12) of the antenna pattern frame when the radiator frame 210 is injection-molded.

According to a second example of the antenna pattern frame of FIGS. 9 and 11, the over-mold part 280 may be formed so as to cover the entirety of adjacent antenna patterns 222 and 228 of the antenna pattern part. The over-mold part 280 is formed so as to cover the entirety of the adjacent antenna patterns 222 and 228 of the antenna pattern part as a resin material is filled in the over-mold part formation portion 380 formed in the manufacturing mold 300 (300 in FIG. 14) of the antenna pattern frame when the radiator frame 210 is injection-molded.

Figure 12:
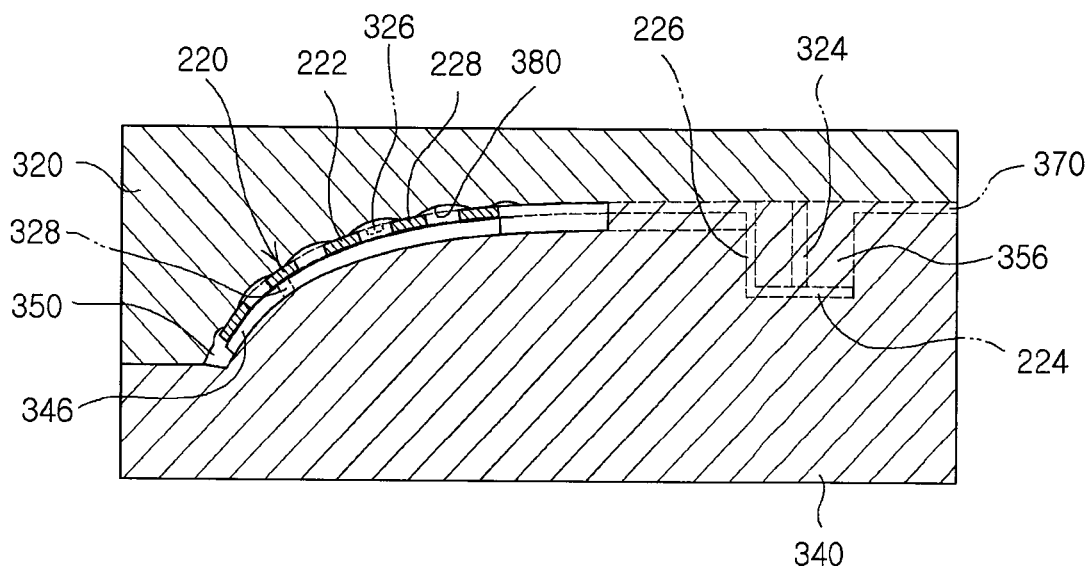
FIG. 12 is a schematic sectional view showing a first example of a manufacturing mold of an antenna pattern frame to explain a method for manufacturing an antenna pattern frame according to an exemplary embodiment of the present invention.

According to a third example of the antenna pattern frame of FIG. 10, the moving contact pin 346 is formed so as to press the antenna pattern part 222 so that the antenna pattern part 222 can be firmly fixed in the manufacturing mold 300 of the antenna pattern frame of FIG. 12.

The moving contact pin 346 may serve to prevent the antenna pattern part 222 from moving within the manufacturing mold 300.

Figure 13:
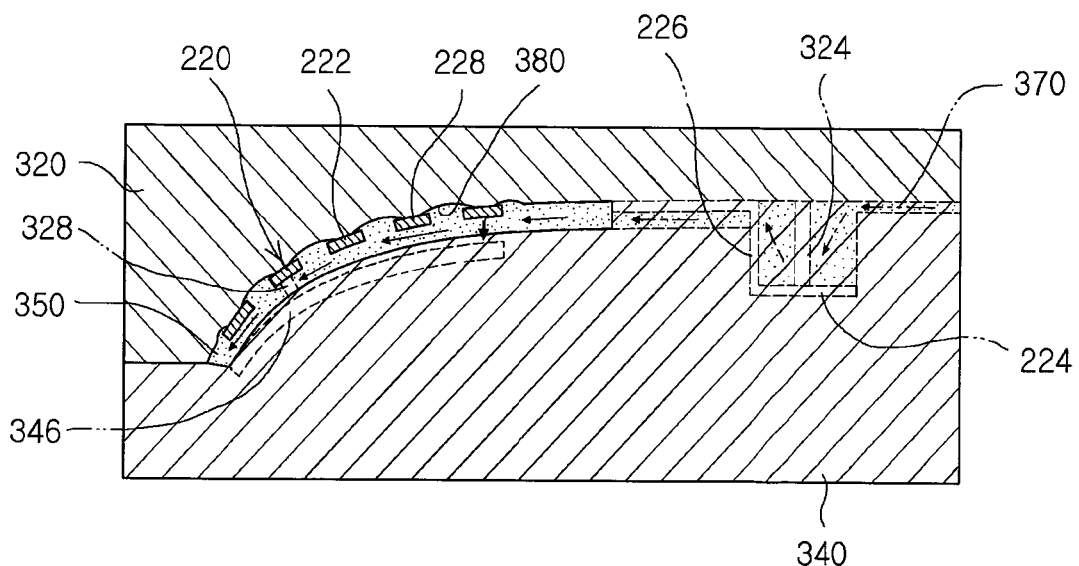
FIG. 13 is a schematic view showing how a resin material is filled in the manufacturing mold of FIG. 12.

Also, in FIG. 13, the moving contact pin 346 may be formed as a movement type contact pin in the manufacturing mold 300 so as to be pushed according to the injection of a resin material in the manufacturing mold 300.

The method and manufacturing mold for manufacturing the antenna pattern frame 200 fabricated in various embodiments will now be described in detail.

FIG. 12 is a schematic sectional view showing a first example of a manufacturing mold of an antenna pattern frame to explain a method for manufacturing an antenna pattern frame according to an exemplary embodiment of the present invention, and FIG. 13 is a schematic view showing how a resin material is filled in the manufacturing mold of FIG. 12.

Figure 14:
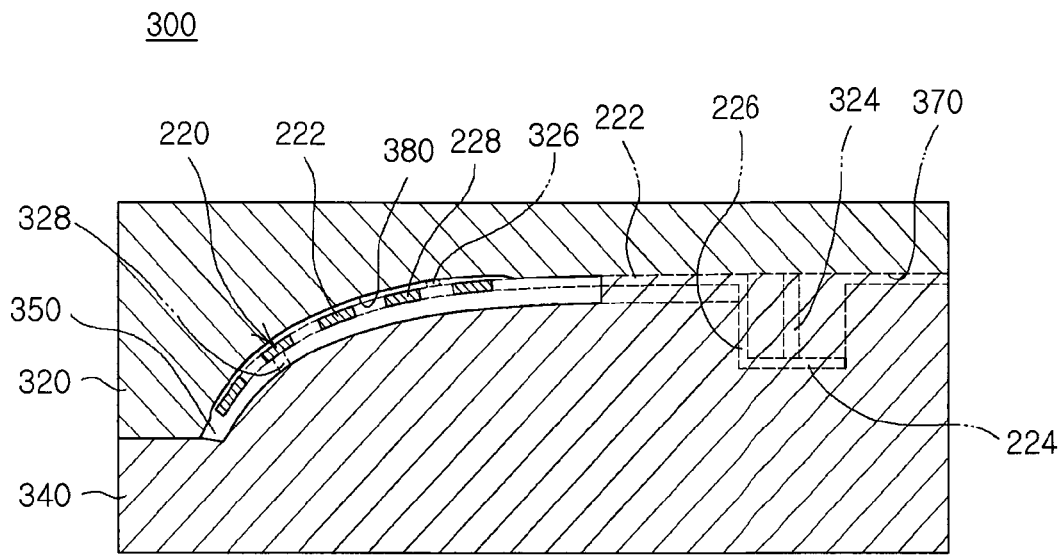
FIG. 14 is a schematic sectional view showing a second example of manufacturing mold of an antenna pattern frame to explain a method for manufacturing an antenna pattern frame according to an exemplary embodiment of the present invention.
Figure 15:
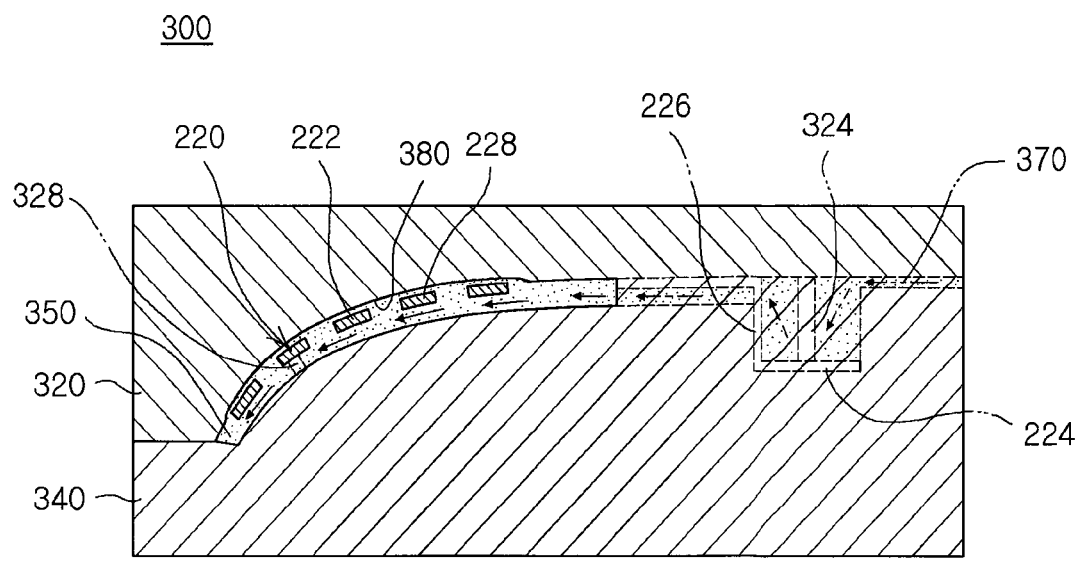
FIG. 15 is a schematic view showing how a resin material is filled in the manufacturing mold of FIG. 14.

FIG. 14 is a schematic sectional view showing a second example of the manufacturing mold of an antenna pattern frame to explain a method for manufacturing an antenna pattern frame according to an exemplary embodiment of the present invention, and FIG. 15 is a schematic view showing how a resin material is filled in the manufacturing mold of FIG. 14.

The method for manufacturing the antenna pattern frame 200 according to an exemplary embodiment of the present invention will now be described with reference to FIGS. 12 to 15.

First, as shown in FIG. 12, the radiator 220 including the antenna pattern part 222 for receiving an external signal is provided in the internal space 350 of the antenna pattern frame such that it is in contact with one surface of the manufacturing mold 300 of the antenna pattern frame.

The guide pin hole 225 and the contact pin hole 223 of the radiator 220 may be simultaneously formed and may be fixed by means of the guide pin 328 and the contact pin 326.

The connection portion 226 may be formed at a portion of the radiator 220, by which the antenna pattern part 222 and the connection terminal portion 224 have different planes.

The pin structure may be optional and omitted, and the fixing of the radiator 220 in the manufacturing mold 300 may be performed such that the antenna pattern part 222 is brought into contact with one surface of the manufacturing mold 300 of the antenna pattern frame and the connection portion 226 is brought into contact with the other surface of the manufacturing mold.

When an upper mold 320 and a lower mold 340 are coupled, the guide pin 328, the contact pin 326, or the guide pin 328 and the contact pin 326 formed on the upper or lower mold 320 or 340 may be received in or may be brought into contact with the guide pin hole 225, the contact pin hole 223, or the guide pin hole 225 and the contact pin hole 223 formed on the antenna pattern part 222, whereby the radiator 220 is fixed in the internal space 350.

The internal space 350 is filled with a resin material so as to become a radiator frame 210 with the antenna pattern part 222 formed thereon, thus allowing the antenna pattern part 222 to be buried in the case 120 of the electronic device.

In this case, when the manufacturing mold 300 of the antenna pattern frame is filled with the resin material, the resin material is filled up to the over-mold part formation portion 380 formed to be recessed into one surface of the manufacturing mold 300 of the antenna pattern frame with which the antenna pattern part 222 is in contact, in order to form the over-mold part 280 for preventing the antenna pattern part 222 from becoming separated from the radiator frame 210.

The moving contact pin 346 may be provided in the manufacturing mold 300 and may press with pressure sufficient to make the contact pin mark 285 (See FIG. 10) in contact with the protruded antenna pattern part 222.

The moving contact pin 346 may be a movement type contact pin pushed into the manufacturing mold 300 according to an injection of the resin material.

The contact mark 285 may be formed in a row on the antenna pattern part 222 so as to have a line the same as that of the over-mold part 280.

First Example of Antenna Pattern Frame Manufacturing Mold

With reference to FIGS. 12 and 13, the manufacturing mold 300 of the antenna pattern frame 200 according to an exemplary embodiment of the present invention is illustrated in detail.

The antenna pattern frame 220 allowing the antenna pattern part 222 to be buried within the case 120 of the electronic device may include the upper and lower molds 320 and 340, a resin material injection part 370, and the over-mold part formation portion 380.

The antenna pattern part 222 for receiving an external signal may be supportedly mounted so as to be in contact in the upper or lower molds 320 and 340.

The resin material injection part 370 is a movement path allowing a resin material to be introduced therethrough, and it may be formed at the upper or lower mold, or upper and lower molds 320 and 340. When the upper and lower molds 320 and 340 are coupled, a resin material is introduced into the internal space 350 of the molds so as to form the radiator frame 210 allowing the antenna pattern part 222 to be buried within the case 120 of the electronic device.

The guide pin 328, the contact pin 326, or the guide pin 328 and the contact pin 326 may be provided on one of the upper, lower, or upper and lower molds 320 and 340 such that they pass through or are in contact with the guide pin hole 225, the contact pin hole 223, or the guide pin hole 225 and the contact pin hole 223 formed on the radiator 220.

The internal space 350 of the upper and lower molds 320 and 340 may include a space allowing the radiator frame 210 to have the curved portion 240.

Also, the internal space 350 of the upper and lower molds 320 and 340 may accommodate the connection terminal portion 224 and include a radiator support formation recess 356 to allow for a formation of the radiator support 250 supporting the connection terminal portion 224.

A pressing pin 324 may be provided in the upper, lower, or upper and lower molds 320 and 340 in order to press the connection terminal portion 224 disposed on the radiator support formation recess 356 so as to tightly attach the connection terminal portion 224 to the radiator support formation recess 356.

When the resin material is introduced, the pressing pin 324 can prevent the resin material from being introduced under the connection terminal portion 224. If a portion of the connection terminal portion 224 is covered by an injection-molded material, the electrical connection thereof would become unstable, so the presence of the pressing pin can prevent such an unstable electrical connection.

The over-mold part formation portion 380 may be formed to allow the over-mold part 280 to cover a portion of the antenna pattern part 222.

Second Example of Antenna Pattern Frame Manufacturing Mold

FIGS. 14 and 15 illustrate the manufacturing mold 300 of the antenna pattern frame 200 in detail, according to an exemplary embodiment of the present invention.

With reference to FIGS. 14 and 15, the second example of the manufacturing mold 300 of the antenna pattern frame 200 is substantially the same as the first example of the manufacturing mold of the antenna pattern frame, except for the following.

The over-mold part formation portion 380 in the second example of the manufacturing mold 300 may allow the over-mold part 280 to be formed so as to cover the entirety of the antenna pattern part 228 adjacent to the antenna pattern part 222 formed in zigzags.

Figure 16:
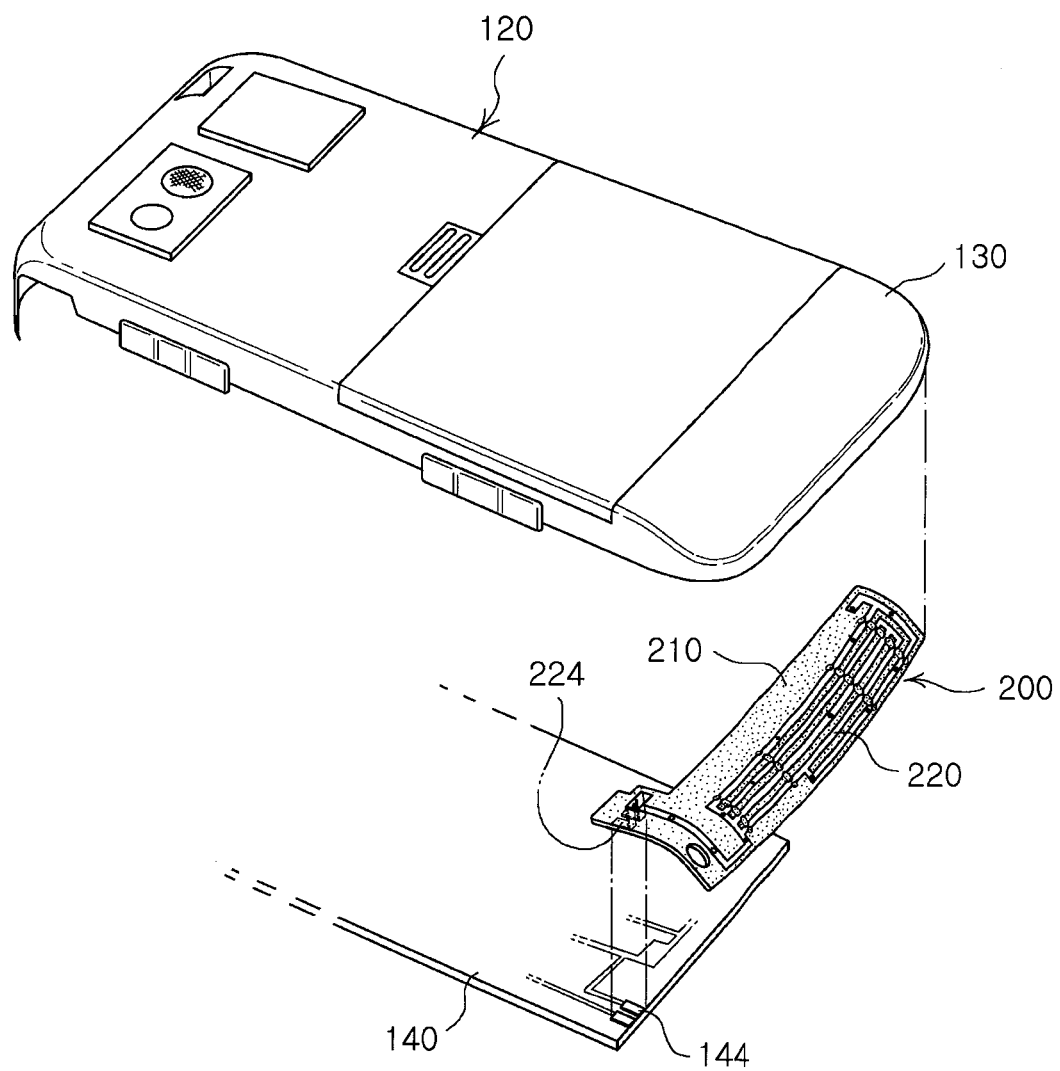
FIG. 16 is an exploded perspective view of a case of a mobile communication terminal, an electronic device, with an antenna pattern radiator buried therein according to an exemplary embodiment of the present invention.

Method for Manufacturing Antenna Pattern Part-Buried Electronic Device Case, and Electronic Device FIG. 16 is an exploded perspective view of a case of a mobile communication terminal, an electronic device, with an antenna pattern radiator buried therein according to an exemplary embodiment of the present invention.

With reference to FIG. 16, the electronic device 100 having the antenna pattern part 222 buried therein may include the antenna pattern frame 200, a case frame 130, and a circuit board 140.

The antenna pattern part 222 formed on the surface of the radiator frame 210 of the antenna pattern frame 200 of the electronic device 100 is fixed without becoming separated therefrom by virtue of the over-mold part 280.

A description of the antenna pattern frame 200 will be replaced with content as described above with reference to FIGS. 2 to 11.

The case frame 130 covers one surface of the radiator frame 210 with the antenna pattern part 222 formed thereon, allowing the antenna pattern part 222 to be buried between the case frame 130 and the radiator frame 210.

The radiator frame 210 and the case frame 130 are integrated through adhesion by using an adhesive or through injection-molding without discrimination of the boundary therebetween. When the case 120 of the electronic device is viewed from the rear, the antenna pattern part 222 may not be seen, and only the connection terminal portion 224 may be seen.

The circuit board 140 drives the electronic device 100 upon receiving an external signal which has been received by the antenna pattern part 222.

The radiator frame 210, the case frame 130, or the radiator frame 210 and the case frame 130 may be formed through injection-molding. In particular, when the radiator frame 210 and the case frame 130 are formed as separate objects, the radiator frame 210 on which the radiator 220 are formed is attached to the case frame 130 and manufactured.

Figure 18:
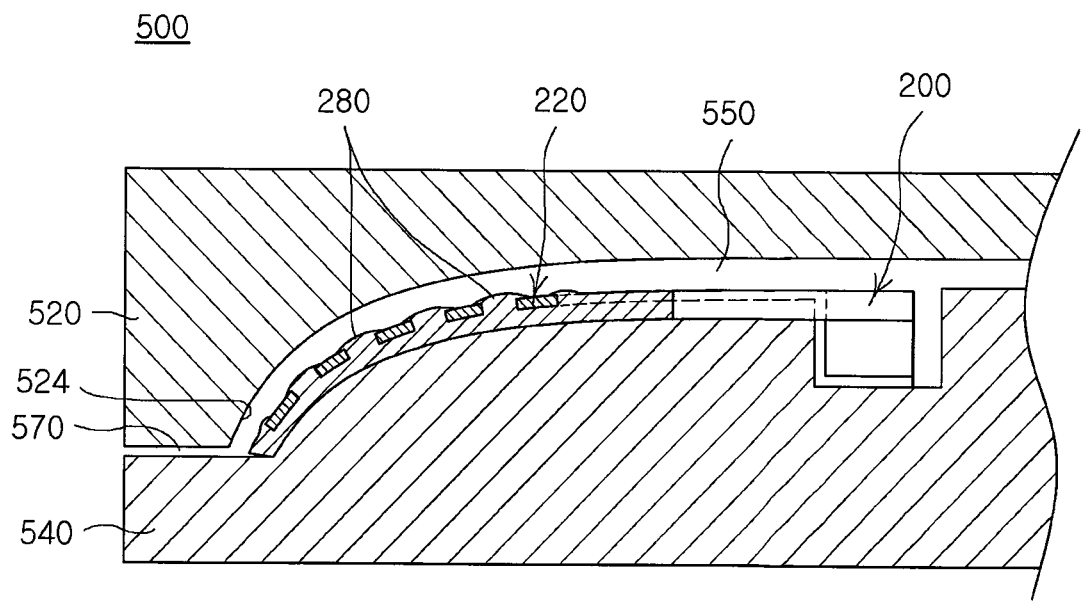
FIG. 18 is a schematic view showing a mold for manufacturing a case of an electronic device used for a second example of the method for manufacturing a case of an electronic device with an antenna pattern radiator according to an exemplary embodiment of the present invention.

Meanwhile, as shown in FIG. 18, the radiator frame 210 may be disposed in a manufacturing mold 500 of the electronic device case, which is then injection-molded, thereby implementing dual injection-molding. Namely, the radiator frame 210 may be put in the mold and insert-injection-molded, thus integrating the radiator frame 210 and the case frame 130.

A method and a mold for manufacturing an electronic device case will now be described with reference to FIGS. 17 to 20.

Figure 17:
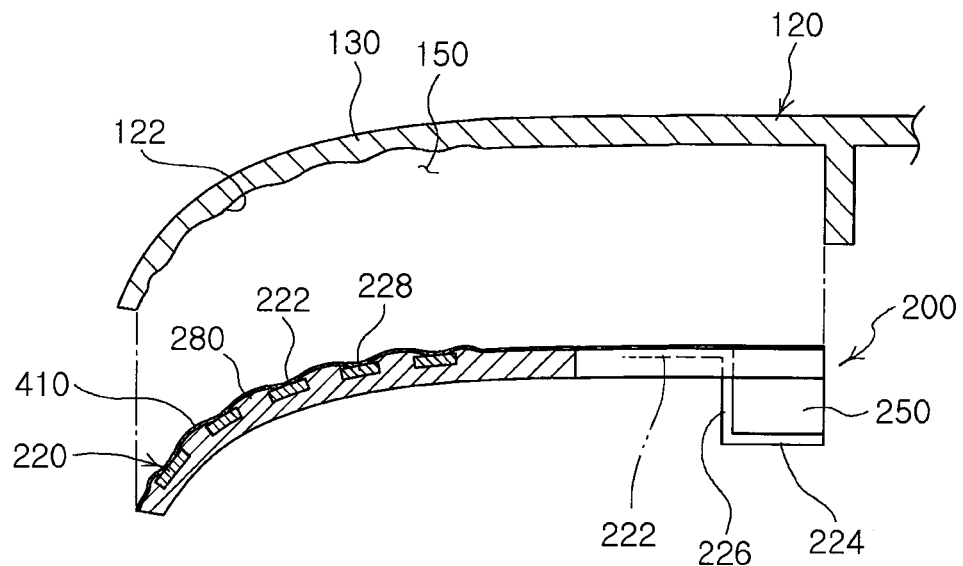
FIG. 17 is a schematic view showing a first example of a method for manufacturing a case of an electronic device with an antenna pattern radiator buried therein according to an exemplary embodiment of the present invention.

FIG. 17 is a schematic view showing a first example of a method for manufacturing a case of an electronic device with an antenna pattern radiator buried therein according to an exemplary embodiment of the present invention.

With reference to FIG. 17, the case frame 130 is an injection-molded product having a space 150 with a shape corresponding to the radiator frame 210 on which the over-mold part 280 is formed, and the case 120 of the electronic device having the antenna pattern radiator buried therein can be manufactured by attaching the radiator frame 210 to a radiator accommodation recess 122.

The antenna pattern frame 200 and the electronic device case frame 130 may be fixed by using an adhesive, and an adhesive layer 410 is formed on the surface of the radiator 220 of the antenna pattern frame 200 as shown in FIG. 17.

Figure 19:
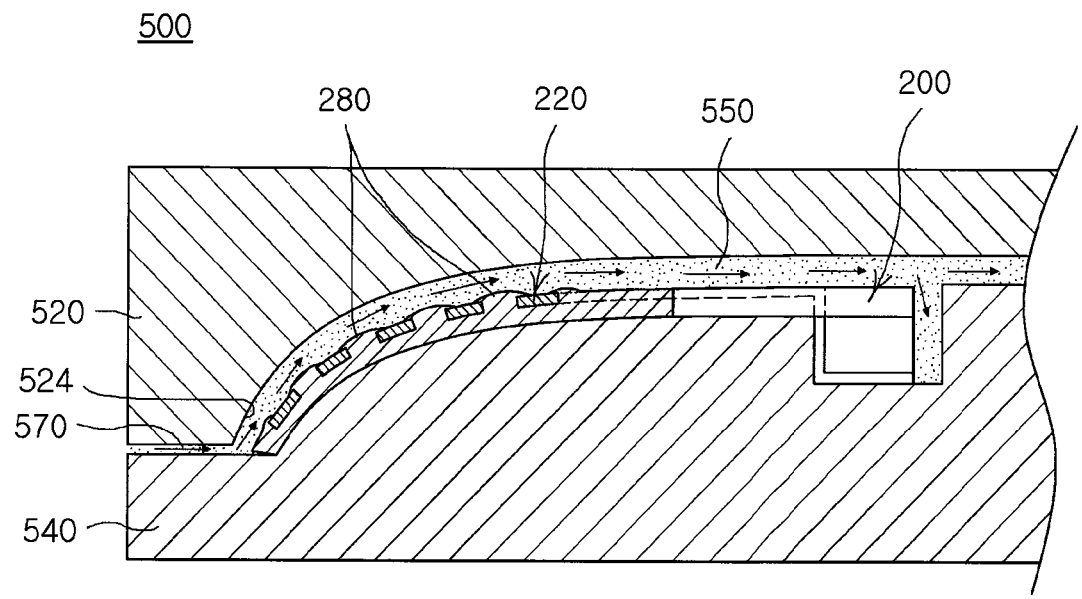
FIG. 19 is a schematic view showing how a resin material is filled in the manufacturing mold of FIG. 18.

FIG. 18 is a schematic view showing a mold for manufacturing a case of an electronic device used for a second example of the method for manufacturing a case of an electronic device with an antenna pattern radiator according to an exemplary embodiment of the present invention, and FIG. 19 is a schematic view showing how a resin material is filled in the manufacturing mold of FIG. 18.

With reference to FIGS. 18 and 19, in manufacturing the case 120 of the electronic device in which the antenna pattern frame 200 is fixed to the radiator frame 210 by means of the over-mold part 280 of the antenna pattern part 222, the radiator frame 210 is disposed in the internal space 550 of the electronic device case manufacturing mold 500, into which a resin material is then introduced to integrate the radiator frame 210 to the electronic device case 120.

When the injection-molding of the antenna pattern frame 200 is primary injection-molding and the injection-molding of the electronic device case 120 is secondary injection-molding, likewise as in the primary injection-molding, the antenna pattern frame 200 can be prevented from moving in the manufacturing mold 500 in the secondary injection-molding.

Also, an internal space 550 of the manufacturing mold 500 may have a shape corresponding to the electronic device case 120, and a resin material is introduced through the injection-molding to form the electronic device case 120. Also, the internal space 500 may have a curve formation portion 524 allowing the electronic device case 120 to have a curve portion.

Meanwhile, in the electronic device case manufacturing mold 500 for manufacturing the electronic device case 120 in which the antenna pattern is buried through the secondary injection-molding, the radiator frame 210 having the radiator 220, including the antenna pattern part 222 that receives an external signal and the connection terminal portion 224 in contact with a circuit board of the electronic device, the antenna pattern part 222 and the connection terminal portion 224 being disposed on different planes, is formed on upper or lower molds 520 or 540, or upper and/or lower molds 520 and 540. In addition, a resin material injection part 570 may be further included to allow a resin material to be introduced into the internal space 550 so that when the upper and lower molds 520 and 540 are coupled, the internal space 550 formed in the molds may become the electronic device case 120.

Figure 20:
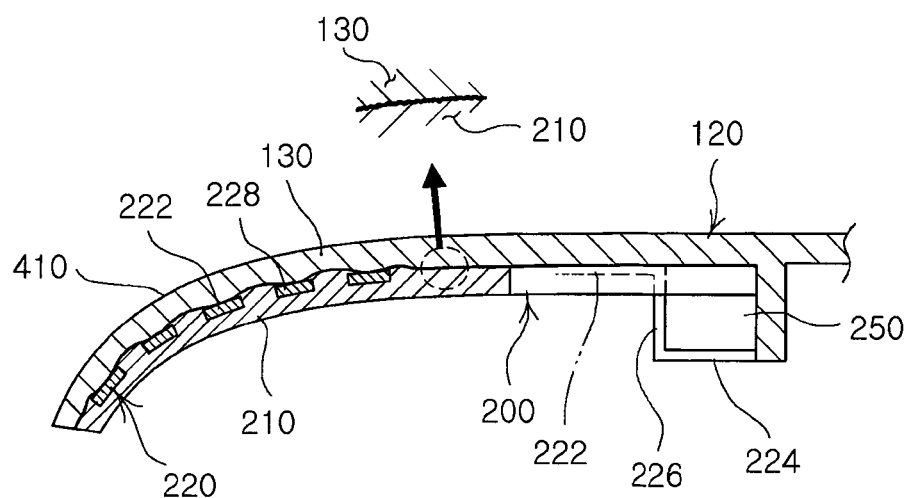
FIG. 20 is a schematic sectional view of a case of an electronic device completed after being injection-molded by the manufacturing mold of FIG. 18.

FIG. 20 is a schematic sectional view of a case of an electronic device completed after being injection-molded by the manufacturing mold of FIG. 18.

The resin material in the secondary injection-molding may be a resin material having a temperature sufficient to melt the surface of the over-mold part 280 and the antenna pattern frame 200 so as to create a connection therebetween.

Accordingly, the contact portions of the case frame 130 and the antenna pattern frame 200 are melted to form a rouge surface, reinforcing the adhesive strength thereof.

As set forth above, according to the antenna pattern frame, the method and mold for manufacturing the same, the method for manufacturing an electronic device case, and an electronic device of exemplary embodiments of the invention, because the radiator having the antenna pattern part is buried in the case of the electronic device, the problem of the vulnerability of the related art external type antenna to an external impact and the increase in the volume caused by the internal type antenna can be solved.

In addition, because the antenna made of a flexible material is buried in the case of the electronic device, the performance and durability of the antenna can be improved as compared with the case in which the radiator is attached to the case of the electronic device by an adhesive.

Also, because the antenna is buried in the electronic device case without using a protective film, the manufacturing process is facilitated and the manufacturing cost can be reduced.

Moreover, because the antenna pattern part formed on the surface of the radiator frame is firmly supported by the over-mold part, the antenna pattern part can be prevented from becoming separated from the radiator frame.

Furthermore, because the antenna pattern frame can be applied to any electronic device requiring an antenna to manufacture an electronic device case with the antenna pattern part buried therein, the antenna pattern frame can be variably applied.

While the present invention has been shown and described in connection with the exemplary embodiments, it will be apparent to those skilled in the art that modifications and variations can be made without departing from the spirit and scope of the invention as defined by the appended claims.

What is claimed is:

1. An electronic device case comprising:
   a radiator frame comprising a surface, and a groove in the surface;
   a radiator disposed in the groove, and comprising an antenna pattern part configured to send and receive a signal;
   an over-mold part attached to the radiator frame, and configured to cover only a portion of the antenna pattern part, to prevent the antenna pattern part from becoming separated from the radiator frame; and
   an electronic device case frame configured to cover the surface of the radiator frame and embedding the entirety of the antenna pattern part between the electronic device case frame and the radiator frame.

2. An electronic device case of claim 1, wherein the radiator comprises:
   a connection terminal portion configured to transmit a received external signal to an electronic device; and
   a connection portion configured to connect the antenna pattern part and the connection terminal portion, such that the antenna pattern part and the connection terminal portion form different planes, and comprising the connection terminal portion formed on the opposite side of the surface of the radiator frame.

3. The electronic device case of claim 2, wherein the connection portion is bent at an angle to the connection terminal portion and the antenna pattern part.

4. The electronic device case of claim 2, wherein the connection terminal portion is supportedly mounted in contact with a radiator support, wherein the radiator support is injection-molded to protrude from the opposite surface of the radiator frame.

5. The electronic device case of claim 4, wherein the connection portion is formed to penetrate the radiator support.

6. The electronic device case of claim 1, wherein the radiator comprises a guide pin hole in which a guide pin of a manufacturing mold is positioned to prevent the radiator from moving within the manufacturing mold during injection molding.

7. The electronic device case of claim 1, wherein the radiator comprises a connection pin hole in which a connection pin of the manufacturing mold is positioned to prevent the radiator from moving within the manufacturing mold during injection molding.

8. The electronic device case of claim 1, wherein the antenna pattern part has antenna patterns formed in zigzags, and the over-mold part is formed to cover only a portion of adjacent antenna patterns of the antenna pattern part.

9. The electronic device case of claim 1, wherein the antenna pattern part has antenna patterns formed in zigzags.

10. The electronic device case of claim 1, wherein the antenna pattern part has antenna patterns formed in zigzags, and a contact pin mark is formed to protrude at the antenna pattern part where the over-mold part is formed.

11. The electronic device case of claim 1, wherein the radiator is flexible and disposed within a curved portion of the radiator frame.

12. The electronic device case of claim 1, wherein the radiator is formed to have a same boundary surface as the radiator frame.

13. The electronic device of claim 1, wherein the radiator frame and the electronic device case frame are coupled.

14. The electronic device of claim 13, wherein the radiator frame and the electronic device case frame are coupled via introduction and molding of resin material between the radiator frame and an internal surface of the electronic device case frame.

15. An electronic device comprising:
   an electronic device case comprising a radiator frame, the radiator frame having a radiator disposed therein, such that an antenna pattern part of the radiator is embedded in a groove in a surface of the radiator frame;
   an over-mold part attached to the radiator frame, and configured to cover only a portion of the antenna pattern part, to prevent the antenna pattern part from becoming separated from the radiator frame;
   an electronic device case frame configured to cover the surface of the radiator frame and embedding the entirety of the antenna pattern part between the electronic device case frame and the radiator frame; and
   a circuit board connected with the antenna pattern part and configured to send and receive a signal.

16. The electronic device of claim 15, wherein the antenna pattern part is connected with a connection terminal portion connected with the circuit board by a connection portion to form an integral radiator, such that the connection terminal portion and the circuit board form different planes, and the antenna pattern part and the connection terminal portion are supportedly mounted in contact with an upper or lower mold, to be injection-molded when the upper and lower molds are coupled to manufacture the antenna pattern frame.

17. The electronic device of claim 16, wherein the connection portion is bent at an angle with respect to the antenna pattern part and the connection terminal portion.

18. The electronic device of claim 15 wherein the radiator frame and the electronic device case frame are coupled.

19. The electronic device of claim 18, wherein the radiator frame and the electronic device case frame are coupled via introduction and molding of resin material between the radiator frame and an internal surface of the electronic device case frame.

* * * * *